United States Patent [19]

Wilcox

[11] 3,898,380

[45] Aug. 5, 1975

[54] AGC DETECTOR CIRCUIT HAVING NOISE AND OVERLOAD CORRECTION CAPABILITY

[75] Inventor: Milton E. Wilcox, Tempe, Ariz.

[73] Assignee: Motorola, Inc., Chicago, Ill.

[22] Filed: Oct. 17, 1973

[21] Appl. No.: 407,404

[52] U.S. Cl.......... 178/7.3 R; 178/DIG. 12; 325/404

[51] Int. Cl........ H04n 5/52; H04b 1/12; H04b 1/16

[58] Field of Search.... 178/DIG. 12, 7.3 R, 7.3 DC; 307/254; 325/400, 404, 473

[56] References Cited

UNITED STATES PATENTS

| | | | |
|---|---|---|---|
| 3,624,290 | 11/1971 | Hofmann | 178/7.3 DC |
| 3,634,620 | 1/1972 | Harford | 178/7.3 DC |

*Primary Examiner*—Robert L. Griffin
*Assistant Examiner*—George G. Stellar
*Attorney, Agent, or Firm*—Vincent J. Rauner; Maurice J. Jones, Jr.

[57] ABSTRACT

The disclosed monolithic gated AGC circuit, which is suitable for use in a T.V. receiver, reduces its gain in response to noise signals so that the developed AGC signal is substantially independent of noise and it corrects video detector overload. Included in the gated AGC circuit are a noise responsive circuit, an AGC comparator, a controllable current source and an overload detector. An AGC capacitor is coupled to the overload detector and to the output terminal and of the AGC comparator. The current source is rendered operative by recurring gating signals and the output current thereof is controlled by a control signal developed by the noise responsive circuit so that noise signals applied to an input terminal of the AGC comparator do not have a deleterious affect on the AGC voltage developed across the capacitor. The overload detector senses signal overload conditions in the video detector and provides a signal which changes the voltage on the AGC capacitor to lower the gain of the RF and IF amplifiers and thereby correct the overload condition.

19 Claims, 4 Drawing Figures

PATENTED AUG 5 1975 3,898,380

SHEET 1

AGC DETECTOR CIRCUIT HAVING NOISE AND OVERLOAD CORRECTION CAPABILITY

BACKGROUND OF THE INVENTION

Present day television receivers require automatic gain control systems (AGC) which provide control signals for selectively adjusting the gains of the radio frequency (RF) and intermediate frequency (IF) amplifier stages of the receivers. One purpose of a television AGC system is to insure that the amplitude of the detected composite video signal remains relatively constant even though the amplitudes of the received signals vary by ratios of as much as a 100 decibels (db). The variation of input signal amplitudes may be caused, for instance, by either changes in transmission conditions or by switching the tuner from an input signal having a high amplitude to another input signal having a relatively much lower amplitude.

Since the peaks of the synchronizing (sync) signals at the video detector output accurately reflect the received signal strength whereas the instantaneous video signal does not, most modern AGC systems for television receivers are keyed or gated to sample the sync peaks. The AGC voltage changes in response to the change in the magnitude of the peaks and adjusts the gain of the RF and IF stages so that the composite video signal ideally stays at a constant amplitude. The horizontal retrace or flyback voltage pulses, produced by the horizontal sweep output transformer, normally occur in time coincidence with the horizontal sync pulses. Thus, such retrace pulses are often employed as keying pulses in prior art AGC systems.

Noise signals having amplitudes greater than the amplitude of the sync pulses sometimes become superimposed on the received composite television signal. If these noise signals occur during the existence of the flyback pulses, the AGC circuitry may undesirable develop a control voltage proportional to the magnitude of the noise signal rather than proportional to the magnitude of the sync pulses. The AGC system then provides a control signal which causes the gain of the IF and RF amplifiers to be reduced too much. Consequently, the magnitude of the composite video signal may be reduced to the level where proper picture reproduction is not accomplished. Moreover, impulse noise signals can falsely trigger the horizontal and vertical sweep systems.

To avoid the foregoing undesirable results, some television receivers include noise detectors which sense the existence of noise signals by utilizing a threshold detector. The detected noise signals are then utilized to disable the sync separator to insure that sync pulses are not generated during the existence of the noise signal. Such improved systems including noise threshold detectors also have been found to have problems under some signal conditions. For example, if the received signal strength is unusually high, the automatic gain control circuit may allow the composite video to have too great of an amplitude. The threshold detector then mistakes the sync pulses for noise pulses and causes the elimination of all the sync pulses. As a result, the flyback pulses may become unsynchronized. The AGC circuit then senses the video signal amplitude rather than the sync tips and allows the gain to increase to cause a lockup condition, known as "detector overload". Some prior art television receivers include a plurality of devices for sensing the overload condition and operating the AGC circuitry to decrease the gain of the IF and RF amplifier stages. The fabrication of prior art AGC circuits having impulse noise and overload immunity in integrated circuit form is sometimes impractical because of practical limitations involved in integrated circuits. More specifically, some prior art circuits require precise values of resistances and larger values of capacitances which are difficult to provide by inexpensive processes in monolithic form. Other prior art circuits either require more terminals than are available or are undesirably temperature sensitive. Furthermore, some prior art circuits are not compatible with monolithic noise detection, sync separator circuits and horizontal sweep systems being commonly used in present television receivers.

Moreover, some prior art noise protected AGC circuits AC or capacitively couple noise control signal from the video detector output terminal into the noise protection circuitry. This AC coupling of the detector output signal to obtain noise protection has two disadvantages. First, such AC coupling limits the duration of the noise pulse which can be coupled to the AGC system. Hence, the noise protection circuitry may not reduce the gain of the AGC circuit sufficiently in the presence of large blocks of impulse noise. Secondly, high frequency information other than noise, such as is included in the chrominance signal or in fast transitions of the luminance signal, occurring at the detector output terminal may be potentially mistaken for noise which results in undesired loss of sync.

SUMMARY OF THE INVENTION

One object of this invention is to provide an improved automatic gain control circuit.

Another object of this invention is to provide an automatic gain control circuit suitable for fabrication in an integrated circuit.

Still another object of this invention is to provide an automatic gain control circuit which is compatible with existing noise protection and noise immune sync separator circuits.

A further object of this invention is to provide an automatic gain control circuit which reduces the deleterious affects of impulse noise on the performance of television receivers.

A still further object of this invention is to provide an automatic gain control circuit including an overload detector circuit.

An additional object of this invention is to provide a noise protected, automatic gain control circuit wherein a noise control signal is direct coupled thereto so that noises of long duration are recognized and so that video information is not mistaken as noise.

The automatic gain control circuit or system of the invention develops a gain control signal having a magnitude which is substantially independent of noise and proportional to the magnitude of the synchronizing signal components of a composite video signal. Included in the automatic gain control circuit are a noise responsive circuit, an AGC comparator, a controllable current source connected to the AGC comparator and an overload detector. An AGC capacitor is coupled to the overload detector and to the output terminal of the AGC comparator. The controllable current source includes a first control terminal which is coupled to receive flyback pulses, a second control electrode which is coupled to receive synchronizing pulses and a third control electrode which is connected to receive a first control signal developed by the noise responsive circuit. The first control signal has a magnitude that is proportional to the average or integral level of the noise impressed upon the composite video signal received by the television set. The current source is rendered conductive in response to the simultaneous application thereto of a flyback and a synchronizing pulse. The amount of current supplied by the current source when conductive and hence the gain of the AGC comparator is controlled by the magnitude of the first control signal. The overload detector senses overload by monitoring the noise responsive circuit to determine when an overload condition occurs and controls the charging of the AGC capacitor to facilitate removal of the overload condition.

DETAILED DESCRIPTION OF THE PREFERRED EMBODIMENT

Figure 1:
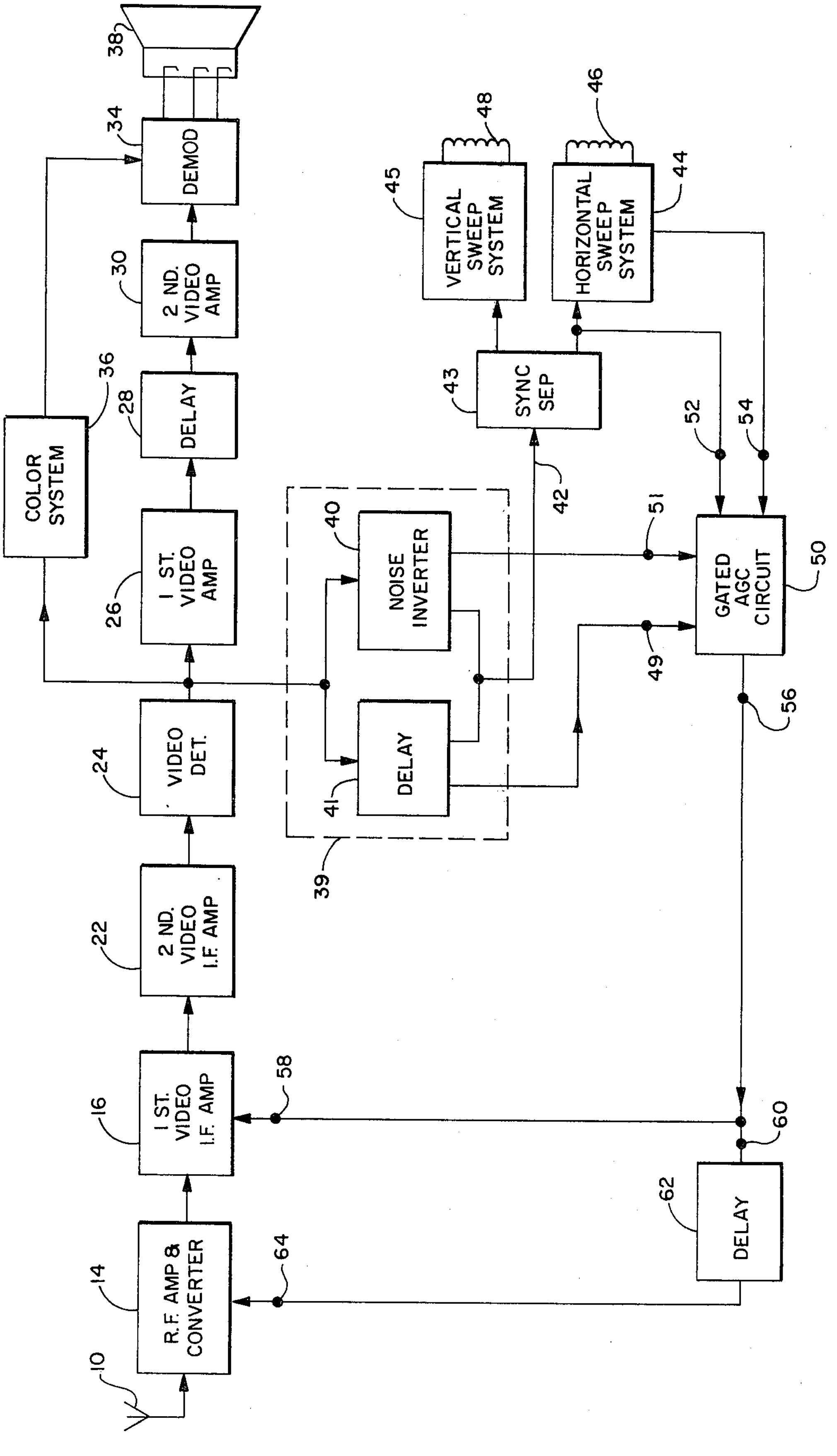
FIG. 1 is a block diagram of a television receiver including a gated AGC circuit.

Referring now to the drawing, FIG. 1 shows a block diagram of a typical color television receiver in which an incoming signal is received by antenna 10 and is applied to a radio receiver frequency (RF) amplifier and converter stage 14, which amplifies and reduces the frequency of the received signals to provide intermediate frequency (IF) signals. These IF signals are then amplified in a series of video IF amplifiers, indicated in the drawing as first and second IF amplifiers 16 and 22. The output signal of IF amplifier 22 is detected in video detector stage 24 to provide a composite video signal.

The brightness and synchronizing components of the video signal are amplified in first video amplifier circuit 26 and then delayed by delay circuit 28 for purposes well-known to those skilled in the art. The delayed brightness and synchronizing signal components, after being amplified by second video amplifier 30, are applied to an input of demodulator circuit 34. The composite video signal is also conducted from the output terminal of video detector 24 to the input terminal of color processing system 36 which is responsive to the color signal components thereof. The chroma signal components, after being processed by color system 36 are applied to another input terminal of demodulator 34. Red, blue and green color control signals are provided to three different cathodes of color cathode ray tube 38 by demodulator 34.

In addition to providing the composite video signal to video amplifier 26 and to color system 36, video detector 24 also supplies the composite video signal to noise gate 39 which includes noise detector or noise inverter 40 and delay circuit 41. Noise detector 40 is supported to detect noise signals having magnitudes in excess of the magnitude of the signal synchronizing components of the composite signal. The detected noise pulses are then utilized to actuate a "clamp" which limits the magnitude of the composite video signal applied to terminal 42 of synchronizing signal separator 43. The detected noise pulses are applied to terminal 51 of gated AGC circuit 50. Horizontal and vertical synchronizing signal components are derived at sync separator 43 and applied to horizontal and vertical sweep systems 44 and 45 respectively. The sweep systems 44 and 45 develop the horizontal and vertical sweep signals in horizontal deflection winding 46 and vertical deflection winding 48, each of which is placed on the neck of cathode ray tube 38. The horizontal synchronizing pulses are applied to terminal 52 of AGC circuit 50. The composite video output signal from delay circuit 41 is applied to terminal 49 of gated AGC circuit 50. The horizontal flyback pulse is coupled from the horizontal sweep system 44 to terminal 54 of gated AGC circuit 50.

A gain control voltage is developed by circuit 50 at AGC output terminal 56. This gain control signal ideally changes in amplitude according to the changes in peak amplitude of the synchronizing pulse components of video signal 49 which are present during the gating interval established by the flyback pulse. The strength of magnitude of the synchronizing pulse is in turn dependent upon the strength of the incoming signal appearing at antenna 10 so that the AGC voltage appearing at output terminal 56 of AGC circuit 50 is representative of the input signal strength. Depending on the nature of RF amplifier and converter 14 and first video IF amplifier 16, with which gain control circuit 50 is used, the gain control voltage at output terminal 56 may be either a forward or a reverse control voltage.

The AGC voltage is applied to control terminal 58 of first video IF amp 16 and to input terminal 60 of delay circuit 62. After an appropriate delay, the AGC voltage is applied by delay circuit 62 to control terminal 64 of RF amplifier and converter circuitry 14. Thus, the gain control voltage operates to initially control the gain of the video IF state 16 and, for increased signal levels, operates to control the gain of the RF and converter stage 14 in a manner which is known.

More information about delay circuit 62 is included in U.S. Pat. No. 3,697,883 entitled "Automatic Gain Control Circuit" which was applied for by the invenntor of the subject application and which is assigned to the assignee of the subject application. The delay and noise inverter circuits 41 and 40, which are illustrated in block form in FIG. 1, are explained in greater detail in U.S. Pat. No. 3,626,303, entitled "Noise Inversion Circuit" which was also applied for by the inventor of the subject application and which is also assigned to the assignee of the subject application.

Unfortunately, noise inverter 40, which operates in a satisfactory manner under most signal conditions, sometimes fails to completely remove noise signals having large magnitudes from composite video. Consequently, the horizontal synchronizing signal applied to terminal 52 of gated AGC circuit 50 still has some noise components thereon. The magnitude of the noise is mistaken for sync magnitude and would cause an undesirable reduction in gain if AGC circuit 50 did not compensate therefor as will be explained.

Figures 2, 4:
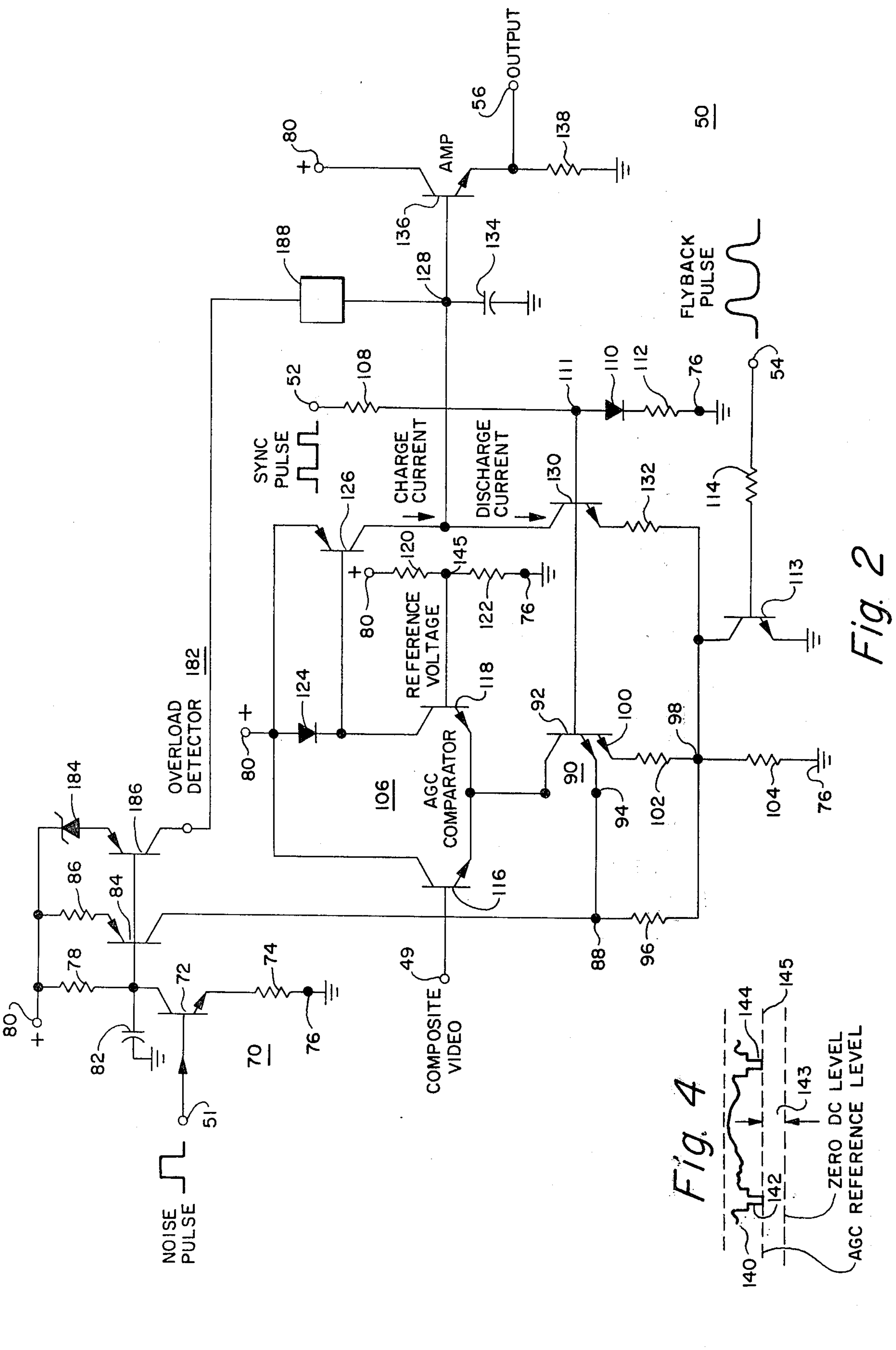
FIG. 2 is a schematic diagram of a gated AGC circuit arranged in accordance with the invention and suitable for use in the receiver diagramed in FIG. 1.
FIG. 4 shows a composite video signal which is useful in understanding the operation of the gated AGC circuit of FIG. 2.

Referring now to FIG. 2, there is shown in detail gated AGC circuit 50 which is illustrated in block form in FIG. 1. Noise responsive control circuit 70 includes an NPN bipolar transistor 72 having its emitter connected through resistor 74 to ground or reference terminal 76. The base or control electrode of transistor 72 is connected to terminal 51 at which noise pulses are generated, as previously described. The collector electrode of transistor 72 is connected through resistor 78 to conductive means or power supply terminal 80 at which a positive power supply voltage is applied and through noise pulse integrating capacitor 82 to reference terminal or conductive means 76. PNP bipolar transistor 84 includes an emitter electrode which is connected through resistor 86 to terminal 80, a base electrode which is connected to the collector of transistor 72 and a collector electrode which is connected to a control terminal 88 of electron control means or current source circuit 90.

Transistor 72 is rendered conductive in response to positive going noise pulses applied to its base by noise detector 40. When transistor 72 is rendered conductive, it tends to discharge noise pulse integrating capacitor 82 which is normally charged through resistor 78 to a peak voltage approaching the magnitude of the positive supply voltage at terminal 80. As capacitor 82 discharges, the base voltage of transistor 84 becomes more negative thereby tending to render transistor 84 conductive. Thus, the analog noise or first control signal developed at current source control terminal 88 has a magnitude which varies in proportion to the average of the noise pulses applied to terminal 51. Although capacitor 82 has been described and shown as being returned to reference terminal 76, it will be obvious to those skilled in the art that the operation of the circuit will not be changed if capacitor 82 is returned to positive supply terminal 80.

Current source 90 includes a dual emitter, NPN transistor 92 of known construction. Bipolar transistor 92 could be replaced by two NPN transistors having their base and collector electrodes tied together as is known. Emitter 94 of transistor 92 is connected to control terminal 88 and through resistor 96 to junction or node 98. Emitter 100 of transistor 92 is connected through resistor 102 to junction 98. Resistor 104 connects junction 98 to reference terminal 76. The collector or output terminal of transistor 92 is connected to control comparator 106.

Biasing for transistor 92 is obtained from the horizontal synchronizing pulses applied to terminal 52. More specifically, current limiting resistor 108 is connected between bias terminal 111 for transistor 92 an terminal 52. The series circuit including diode 110 and resistor 112 connects the base of transistor 92 to reference terminal 76.

NPN switch transistor 113 includes a base electrode which is connected through resistor 114 to terminal 54 at which recurring gating or flyback pulses occur. The collector electrode of transistor 113 is connected to junction 98 and the emitter electrode is connected to the reference terminal. Transistor 113 is rendered conductive by positive going flyback pulses to shunt and thereby remove the negative feedback effect of resistor 104 so that transistor 92 can be rendered conductive in response to positive going horizontal sync pulses applied to the base electrode and which occur during the existence of the flyback pulses.

Automatic gain control comparator 106 includes differentially connected NPN transistors 116 and 118. The base electrode of transistor 116 is connected to terminal 49 at which the composite video signal is developed and the base electrode of transistor 118 is connected to the junction between voltage divider resistors 120 and 122. A temperature stable reference voltage is applied to the base of transistor 118 by resistors 120 and 122, which are connected in series between power supply terminals 76 and 80. The collector of transistor 116 is directly connected to power supply terminal 80 and the collector of transistor 118 is connected through diode 124 to power supply 80. PNP transistor 126 includes an emitter connected to terminal 80, a base electrode connected to a collector of transistor 118 and a collector connected to AGC comparator output terminal 128. Diode 124 and transistor 126 provide a double-to-single ended converter of known configuration for comparator 106.

Discharge current control transistor 130 includes a base electrode which is connected to bias terminal 111, an emitter electrode which is connected through resistor 132 to node 98 and a collector electrode which is connected to comparator output terminal 128. Automatic gain control capacitor 134 is connected between comparator output terminal 128 and the reference terminal. Emitter follower amplifier transistor 136 includes a collector electrode connected to power supply terminal 80, an emitter electrode connected through load resistor 138 to the reference terminal and a base or control electrode connected to capacitor 134.

Figure 3:
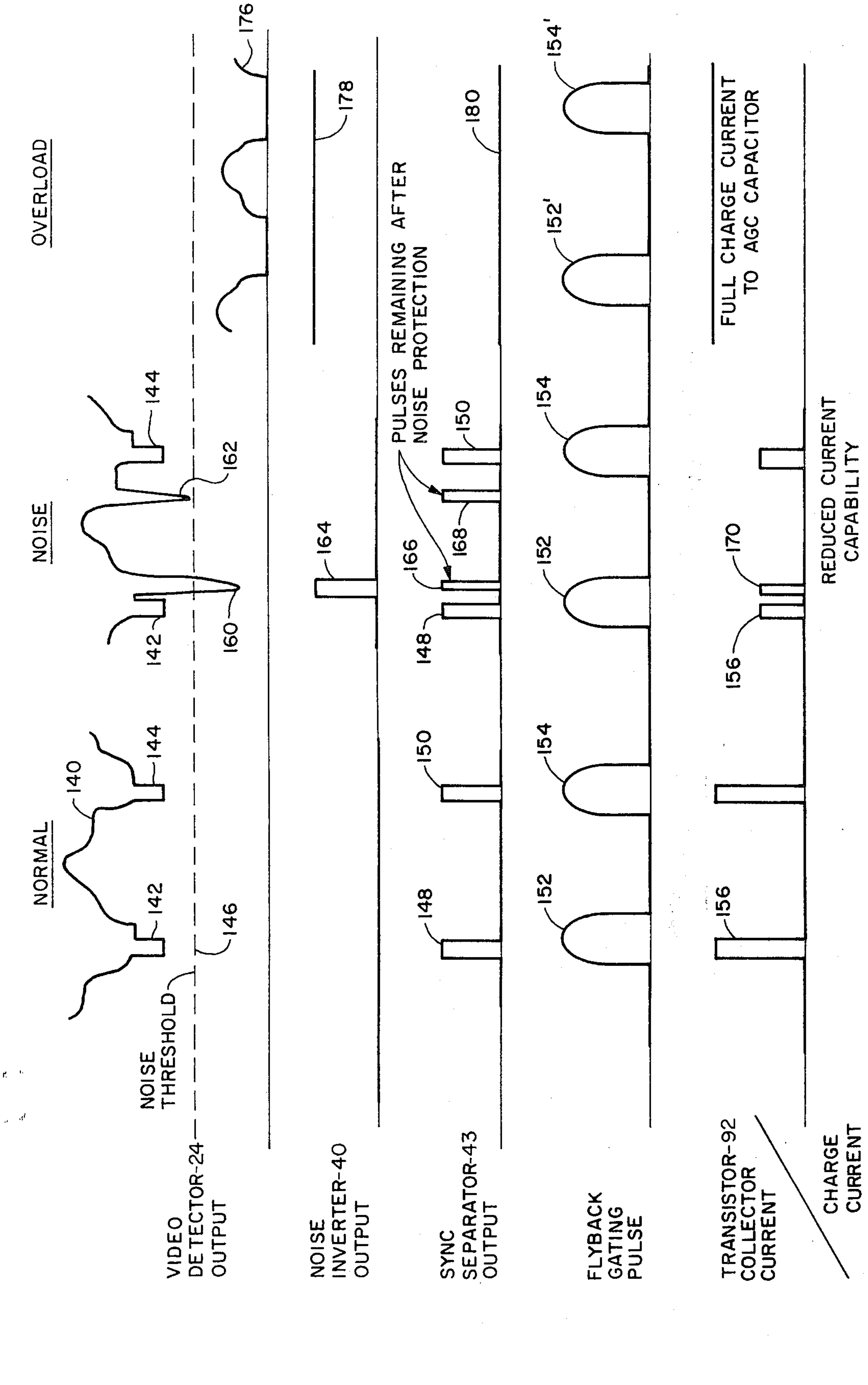
FIG. 3 shows a plurality of waveforms useful in understanding the various modes of operation of the circuitry of FIG. 2.

FIG. 3 shows output signal waveforms illustrating some of the various modes of operation of gated AGC circuit 50. The "normal" mode of operation refers to the condition where the magnitude of the video signal at the output terminal of detector 24 is less than the noise threshold of detector 40. Hence, noise pulses are not being applied to terminal 51 and video detector 24 is not overloaded. More specifically, waveform 140 of FIG. 3 indicates a normal composite video signal wherein the tips of horizontal synchronizing pulses 142 and 144 are above the negative threshold level 146 of noise detector 40. Consequently, noise detector 40 provides no output signal to terminal 51 and sync separator 43 removes and inverts horizontal synchronizing signals 142 and 144 to generate sync pulses 148 and 150. Also, horizontal sweep system 44 provides flyback gating pulses 152 and 154 which are respectively synchronized with sync pulses 148 and 150. The time coincidence of the occurrence of sync separator output pulse 148 during the duration of flyback gating pulse 152 renders current source transistor 92 conductive so that it draws a collector current pulse through comparator 106 and renders discharge transistor 130 conductive. The collector current of transistor 92 is represented by pulse 156. If the positive magnitude 143, shown in FIG. 4, of sync pulse 142 applied through terminal 49 to the base of transistor 116 is more positive than the AGC reference voltage level 145 applied to the base of transistor 118 then transistor 116 conducts most of the current supplied by the collector of transistor 92. Consequently, transistor 126 tends to supply a decreased amount of current to automatic gain control voltage capacitor 134. Hence, the voltage across capacitor 134 and at terminal 56 decreases because of discharge through transistor 130. Thus, IF amplifier 16 is caused to have increased gain so that the magnitude of the negative going sync pulses 142 and 144 extend down to AGC reference level 145.

Alternatively, if the amplitude of negative going sync pulses 142 and 144 enables the voltage on the base of transistor 116 to be less positive than the level of the AGC reference voltage developed at the base of transistor 118, then transistor 118 conducts most of the collector current demanded by current source 90 thereby causing transistor 126 to be more conductive which increases the charge current and hence the voltage across automatic gain control voltage developing capacitor 134. The resulting increased voltage at terminal 56 causes a decrease in gain which forces the negative going sync pulses to only extend to the AGC reference level 145. Although discharge current transistor 130 is again rendered conductive during the sync pulses, the charge current supplied by transistor 126 exceeds the discharge current.

During the "noise" mode of operation, the composite video signal at the output terminal of video detector 24 includes noise such as spikes 160 and 162 shown in FIG. 3. Noise detector circuit 40 responds to noise pulse 160, which has a magnitude crossing noise threshold level 146, to provide an output noise pulse 164 to terminal 51. Moreover, in spite of noise detector 40, noise pulses 160 and 162 still may cause narrow pulses 166 and 168 to occur at the input terminal and horizontal output terminal of sync separator 43. Since noise pulse 166 occurs during flyback gating pulse 152, it tends to cause unwanted current pulse 170 through the collector of transistor 92. Since noise pulse 168 does not occur during flyback gating pulse 154, it produces no undesired collector output current pulse.

Transistor 84 is rendered conductive to continuously supply an analog noise control signal to resistor 96 so long as capacitor 82 remains discharged below the threshold voltage of transistor 84. As a result of the increased negative feedback voltage developed across resistor 96 by the noise control signal, the amount of collector current conducted by transistor 92 is reduced as indicated by the reduced magnitude of pulses 156 and 170 of FIG. 3. Hence, the ABC capacitor charge current generated by the noise voltage at the base of transistor 116 being less than the instantaneous voltage at the base of transistor 118 has reduced magnitude as compared to what the magnitude of the charge current would have been if transistor 84 had not been rendered conductive. The gain or ratio of the AGC output voltage magnitude to composite video magnitude is reduced while noise is superimposed on the composite video. Thus, little or no undesirable change in the AGC voltage developed by capacitor 134 is caused by noise pulse 160. Consequently, gated AGC circuit 50 reduces the deleterious affects of impulse noise on the performance of a television receiver.

Noise pulse 164 is directly coupled to transistor 72 and integrated by capacitor 82. Transistor 84 responds to the voltage on capacitor 82 and the resulting analog noise control signal is direct coupled from the collector of transistor 84 to control the base-to-emitter voltage of transistor 92. This direct coupling enables gated AGC circuit 50 to have advantages with respect to prior art circuits utilizing capacitive coupling. More particularly, capacitively coupled systems tend to be nonresponsive to noises having long durations and to undesirably mistake high frequency video information as noise. Direct coupled circuit 50 can respond to noises having long duration and does not mistake high frequency video information for noise.

Next, the "overload" mode of operation of AGC circuit 50 is described. As previously pointed out, noise detector circuit 40 senses the existence of a noise signal by utilizing a threshold detector which is set to threshold level 146 of FIG. 3. If an input signal is received by antenna 10 which has an unusually high magnitude, it is possible for the composite video signal occurring at the output terminal of video detector 24 to likewise have an undesirably high magnitude, which is illustrated by waveform 176 of FIG. 3. Sync pulses such as 142 and 144 are in effect clipped from composite video signal 176. Noise inverter circuit 40 then provides a DC level, illustrated by line 178, to sync separator 43. As a result, sync separator 43 discontinues the application of synchronizing pulses to horizontal sweep system 44 and vertical sweep system 45. Flyback gating pulses 152' and 154' may then become unsynchronized. Consequently, the horizontal and vertical sweep systems are likely to provide output signals which move in and out of phase with the received synchronizing signals. Since under the overloaded condition gated AGC circuit 50 samples the video magnitude rather than the sync magnitude, the gain reducing signals required to correct the overload are not applied to RF amplifier and converter 14 and first video IF amplifier 16 and the television receiver no longer provides a picture.

To avoid the above undesirable results, AGC circuit 50 includes overload detector circuit 182, which is shown in FIG. 2. Zener diode 184 is connected between positive power supply terminal 80 and the emitter of PNP transistor 186. The base of transistor 186 is connected to the base of transistor 84 and the collector of transistor 186 is connected through circuit 188 to AGC capacitor 134. Circuit 188 may include either an amplifier, a voltage divider or direct conductive connection depending on system requirements.

In operation, transistor 72 responds to the DC level 178, which is applied to terminal 51 as a result of the overload, to discharge capacitor 82 in the negative direction until the voltage of capacitor 82 is below a predetermined level, which is lower than the level to which the noise signals could cause capacitor 82 to discharge. This predetermined negative level is defined by the sum of the breakdown voltage of zener diode 184 and the base-to-emitter turn-on voltage of transistor 186. Transistor 186 is rendered conductive in response to the voltage on capacitor 82 falling below the predetermined level. Zener diode 184 is chosen to have a high enough breakdown voltage such that transistor 186 is not rendered conductive by the integral or average of the noise signals applied to terminal 51. When transistor 186 is rendered conductive by the overload condition, it supplies a charge current through circuit 188 to AGC capacitor 134. Transistor 136 responds to the resulting increasing voltage across capacitor 134 to provide a gain reducing signal to RF amplifier and converter 14 and video IF amplifier 16. Consequently, the respective gains of these circuits are decreased until the amplitude of the video signal is reduced below noise threshold level 146. Capacitor 82 then recharges toward the positive voltage level applied to terminal 80 and renders overload transistor 186 nonconductive. Hence, circuit 50 includes an automatic gain control circuit having an overload detector which senses overload conditions and lowers the gain of the RF and IF amplifiers to eliminate the overload.

The values of the components of circuit 50 are chosen such that when transistor 113 is in its normally off condition in the absence of a flyback pulse and in the absence of an analog noise control signal, a small amount of current flows in current source transistor 92. This current is necessary to enable AGC action when the receiver goes out of horizontal hold and the flyback pulses no longer align with the sync pulses. Thus, even in the absence of a flyback pulse, a small amount of charge current can be provided by AGC comparator 106. To accomplish this result, the value of resistor 104 may be made much larger than the values of resistors 96 and 102. Th value of resistor 96 is chosen to enable an analog noise control signal provided by transistor 84 to result in sufficient negative feedback to cause emitter 94 to be rendered completely nonconductive.

The value of resistor 86 is chosen such that under severe noise conditions the current supplied through the collector of transistor 84 can be greater than or equal to the current conducted through resistor 96 in the absence of noise. Hence, the collector current of transistor 92 is approximately equal to the current conducted by resistor 102 during the presence of a gating pulse and a high amplitude analog noise signal and is zero during the presence of an analog noise control signal when no gating pulse exists.

Values for components of an operative gated AGC circuit 50 are as follows:

| | | |
|---|---|---|
| Capacitor 82 | 2 | microfarads |
| Capacitor 134 | 0.2 | microfarads |
| Resistor 74 | 3,300 | ohms |
| Resistor 78 | 7,500 | ohms |
| Resistor 86 | 10,000 | ohms |
| Resistor 96 | 1,000 | ohms |
| Resistor 102 | 1,500 | ohms |
| Resistor 104 | 10,000 | ohms |
| Resistor 108 | 5,100 | ohms |
| Resistor 112 | 510 | ohms |
| Resistor 114 | 470 | ohms |
| Resistor 120 | 20,000 | ohms |
| Resistor 122 | 5,000 | ohms |
| Resistor 132 | 680 | ohms |

Noise pulses applied to terminal 51 can have a regulated seven volt amplitude. The sync pulses applied to terminal 52 can have a regulated seven volt amplitudue in series with 5,100 ohms and the AGC gate of flyback pulse can have an amplitude of 10 volts in series with 470 ohms.

What has been described is an AGC circuit 50 including detector overload correction and noise protection circuitry. The AGC circuit, shown in FIG. 2, except for capacitor 82 and capacitor 134, is suitable for manufacture in monolithic integrated circuit form and is compatible with monolithic noise detection circuitry. The AGC circuit has a relatively simple configuration, as compared to prior art circuits, which reduces required die area and improves production yield to thereby facilitate economic fabrication. Although transistor 92 has been described as being a dual-emitter transistor, an operative circuit has been made by substituting a single emitter transistor and eliminating resistor 102. Moreover, the conductivity of the transistor and power supply polarities could be reversed without departing from the spirit and scope of the invention which is defined by the appended claims.

I claim:

1. An automatic gain control circuit for developing a gain control signal, and an overload control signal, the gain control signal being substantially independent of noise and having a magnitude proportional to the magnitude of a recurring input signal which sometimes includes noise components, the automatic gain control circuit including in combination:

first signal supply means for providing a recurring gating signal at an output terminal thereof;

second signal supply means for providing a recurring synchronizing signal at an output terminal thereof;

noise responsive circuit means for providing a first control signal at an output terminal thereof, said first control signal having a magnitude which is a function of the average level of the noise included in the recurring input signal, electron control means having a first control terminal coupled to said output terminal of said first signal supply means, a second control terminal coupled to said output terminal of said second signal supply means, a third control terminal coupled to said output terminal of said noise responsive circuit means, said electron control means being adapted to be rendered operative in response to the simultaneous existence of said gating signal and said synchronizing signal, said electron control means when operative being further responsive to said first control signal to provide a second control signal at an output terminal thereof having a magnitude which is a function of said magnitude of said first control signal; and overload detector means coupled to said noise responsive circuit means, said overload detector means providing the overload control signal at an output terminal thereof in response to said noise responsive circuit being overloaded.

2. The automatic gain control circuit of claim 1 wherein said overload detector means includes an electron control means and a reference voltage means.

3. The automatic gain control circuit of claim 1 wherein said noise responsive circuit means includes in combination:

first transistor means having a control electrode adapted to receive noise pulses, a first electrode and a second electrode;

first conductive means adapted to apply a power supply voltage of a first polarity;

second conductive means adapted to apply a power supply voltage of a second polarity;

first resistive means connecting said first electrode to said first conductive means;

second resistive means connecting said second electrode to said second conductive means;

capacitive means connected between said first electrode and one of said first and said second conductive means;

second transistor means hving a control electrode connected to said first electrode of said first transistor means, said second transistor means further having a first electrode being said output terminal of said noise responsive circuit means and a second electrode; and third resistive means connecting said second electrode of said second transistor means to said first conductive means, said noise responsive circuit providing said first control signal having a magnitude that is proportional to the integral of said noise pulses.

4. The automatic gain control circuit of claim 1 wherein said electron control means includes:

first transistor means having a control electrode being said first control terminal and receiving said recurring gating signal, a first electrode and a second electrode;

first conductive means providing a power supply potential of a first polarity being connected to said first electrode of said first transistor means;

first resistive means connected from said second electrode of said first transistor means to said first conductive means;

second resistive means connected between said third control electrode of said electron control means and said second electrode of said first transistor means, said second resistive means receiving said first control signal; and second transistor means having a first control electrode connected to said second resistive means, a second control electrode being said second control terminal of said electron control means and receiving said recurring synchronizing signal, and said second transistor means further having an output electrode being said output terminal of said electron control means, said second transistor means being reduced conductive in response to both said first transistor control means being rendered conductive simultaneously with the application of one of said recurring synchronizing signals to said second control electrode, the magnitude of said second control signal being inversely related to the magnitude of the current conducted by said second resistive means in response to said first control signal.

5. The automatic gain control circuit of claim 4 wherein:

said second transistor means is a dual emitter, bipolar transistor having first and second emitter electrodes, a base electrode and a collector electrode, said first emitter electrode being said first control electrode, said base electrode being said second control electrode, and said collector electrode being said output electrode; and further including third resistive means connecting said second emitter electrode to said second electrode of said first transistor means.

6. The automatic gain control circuit of claim 5 wherein said base electrode of said second transistor means is connected to said first conductive means through a series circuit including diode means and resistive means.

7. The automatic gain control circuit of claim 4 wherein said first transistor means is a bipolar transistor including emitter, base and collector electrodes, said emitter electrode being said first electrode, said base electrode being said control electrode, and said collector electrode being said second electrode.

8. The automatic gain control circuit of claim 1 further including in the combination:

comparator means having a gain control terminal connected to said output terminal of said electron control means, a first input terminal adapted to receive an automatic gain control reference voltage, and a second input terminal adapted to receive the recurring input signal, said comparator means having an output terminal at which a gain controlled output signal is developed, the ratio of the magnitude of the recurring gain controlled output signal to the magnitude of said recurring input signal being a function of said magnitude of said second control signal.

9. The automatic gain control circuit of claim 8 further including:

capacitive means coupled to said output terminal of said comparator means for developing an automatic gain control voltage which varies as a function of the average value of said gain controlled output signal.

10. The automatic gain control circuit of claim 9 wherein said overload detector means is connected between said noise responsive circuit means and said capacitive means.

11. The automatic gain control circuit of claim 10 wherein said overload detector means includes:

zener diode means having first and second terminals; and transistor means having a first electrode connected to said zener diode means, a control electrode connected to said noise responsive circuit means and a second electrode connected to said capacitive means.

12. In a television receiver having noise detecting circuitry providing noise control signals at an output terminal thereof, a comparator having input, output and gain control terminals, synchronizing signal circuitry providing synchronizing pulses at an output terminal thereof, sweep circuitry providing flyback pulses at an output terminal thereof, a video detector circuit which provides a composite video signal having noise components to one of the input terminals of the comparator, an automatic gain control circuit for developing a gain control signal having a magnitude which is substantially independent of the noise components and which is proportional to the magnitude of the synchronizing signal components of the composite video signal, including in combination:

noise control signal responsive circuit means having an input terminal connected to the output terminal of the noise detecting circuitry and an output terminal, said noise control signal responsive circuit means providing a first control signal at said output terminal thereof which has a magnitude that is proportional to the magnitude of the noise control signals;

comparator current source means having a first control terminal coupled to the output terminal of the sweep circuitry, a second control terminal coupled to the output terminal of the synchronizing signal circuitry, a third control terminal coupled to said output terminal of said noise control signal responsive circuit means, and an output terminal connected to the gain control terminal of the comparator, said comparator current source means being rendered operative in response to the simultaneous application thereto of one of the flyback pulses and one of the synchronizing pulses to provide a second control signal to the comparator, said comparator current source means when operative being further responsive to said first control signal to cause the magnitude of said second control signal to vary in inverse proportion to said magnitude of said first control signal, said second control signal controlling the gain of the comparator to facilitate the development of the gain control signal at the output terminal of the comparator, said comparator output terminal being coupled to a gain controlled circuit, and overload detector means coupled between said noise control signal responsive circuit means and the output terminal of the comparator, said overload detector means providing an overload control signal to the output terminal of the comparator in response to said noise control signal responsive means becoming overloaded.

13. The combination of claim 12 wherein said noise control signal responsive circuit means includes in combination:

first transistor means having a control electrode adapted to receive the noise control signals, a first electrode and a second electrode;

first conductive means adapted to apply a power supply voltage of a first polarity;

second conductive means adapted to apply a power supply voltage of a second polarity;

first resistive means connecting said first electrode to said first conductive means;

second resistive means connecting said second electrode to said second conductive means;

capacitive means connected between said first electrode and one of said first and said second conductive means;

second transistor means having a control electrode connected to said first electrode of said first transistor means, said second transistor means further having a first electrode being said output terminal of said noise control signal responsive circuit means and a second electrode; and third resistive means connecting said second electrode of said second transistor means to said first conductive means, said noise control signal responsive circuit means providing said first control signal having a magnitude that is proportional to the integral of said noise control signals.

14. The combination of claim 12 wherein said comparator current source means includes:

first transistor means having a control electrode being said first control terminal and receiving said flyback pulses, a first electrode and a second electrode;

first conductive means adapted to provide a power supply potential of a first polarity and being connected to said first electrode of said first transistor means;

first resistive means connected from said second electrode of said first transistor means to said first conductive means;

second resistive means connected between said third control terminal of said comparator current source means and said second electrode of said first transistor means, said second resistive means receiving said first control signal; and second transistor means having a first control electrode connected to said second resistive means, a second control electrode being said second control terminal of said comparator current source means and receiving the synchronizing pulses, and said second transistor means further having an output electrode being said output terminal of said comparator current source means, said second transistor means being rendered conductive in response to said first transistor means being rendered conductive simultaneously with the application of one of said synchronizing pulses to said second control electrode, the magnitude of said second control signal being inversely related to the magnitude of the current conducted by said second resistive means in response to said first control signal.

15. The combination of claim 14 wherein:

said second transistor means is a bipolar transistor having first and second emitter electrodes, a base electrode and a collector electrode, said first emitter electrode being said first control electrode, said base electrode being said second control electrode, and said collector electrode being said output electrode; and further including third resistive means connecting said second emitter electrode to said second electrode of said first transistor means.

16. The combination of claim 14 wherein said first transistor means is a bipolar transistor including emitter, base and collector electrodes, said emitter electrode being said first electrode, said base electrode being said control electrode, and said collector electrode being said second electrode.

17. The combination of claim 12 further including:

capacitive means coupled to the output terminal of the comparator for developing an automatic gain control voltage.

18. The combination of claim 12 wherein said overload detector means includes:

zener diode means having first and second terminals; and transistor means having a first electrode connected to said zener diode means, a control electrode connected to said noise control signal responsive circuit means and a second electrode coupled to the output terminal of the comparator.

19. The combination of claim 18 wherein said second electrode of said transistor means is directly connected to the output terminal of the comparator.

* * * * *